Patented Oct. 6, 1953

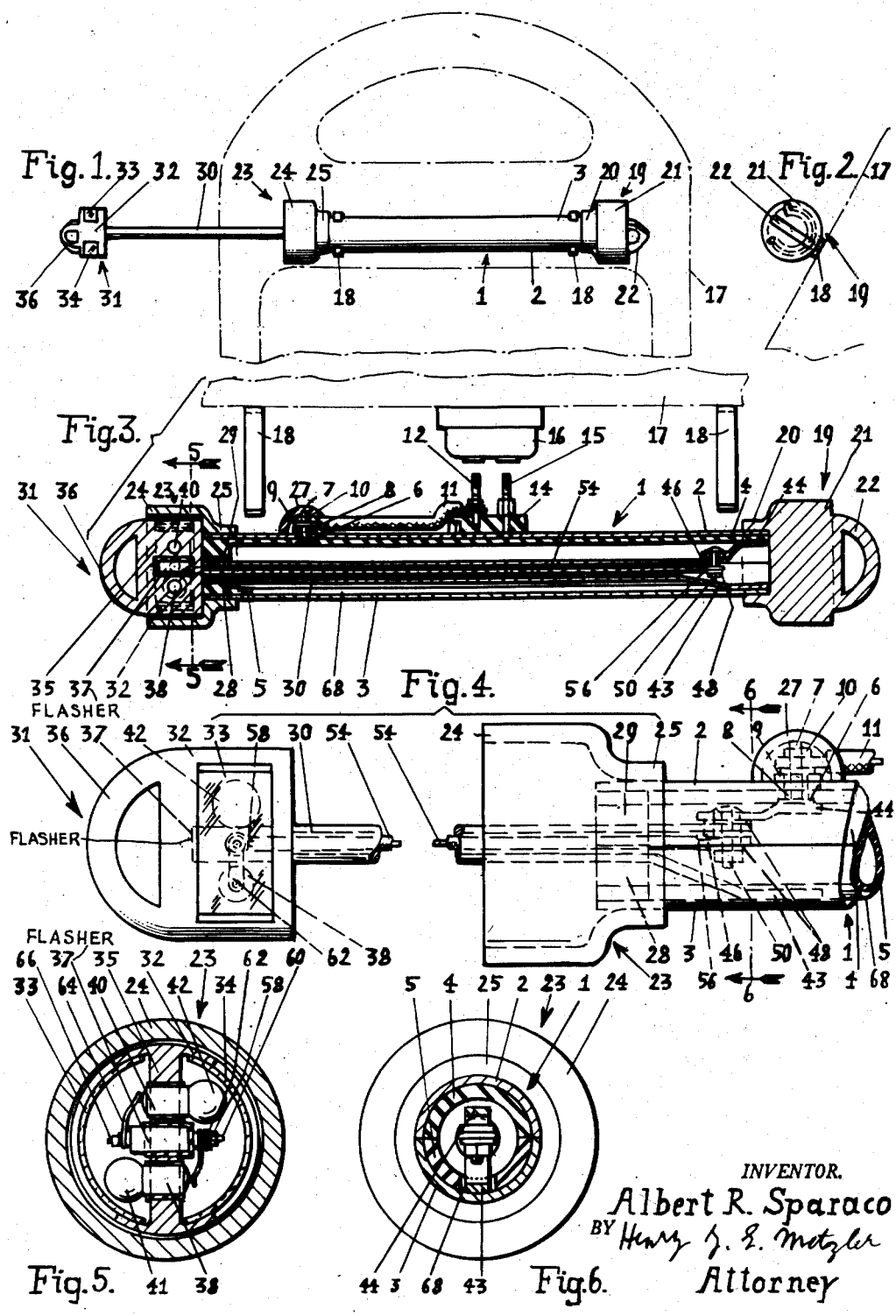

2,654,877

UNITED STATES PATENT OFFICE 2,654,877

REPAIR AND WARNING LAMP FOR VEHICLES

Albert R. Sparaco, Marlboro, N. Y.

Application September 3, 1952, Serial No. 307,647

2 Claims. (Cl. 340—146)

The present invention relates to accessories for automobiles and other vehicles and, more specifically, to a new repair and warning lamp for vehicles which is an improvement over the construction disclosed by my Patent No. 2,503,974.

Emergency repairs on crowded highways at night time, such as the changing of a wheel of an automobile, or the like endanger the life of the person working on the vehicle unless warning is given to the oncoming other vehicles, so that the latter pass by at a safe distance and do not hit the operator working on the defective vehicle. The tail lights as well as the front lights of the defective vehicle do not indicate whether or not a person is working on that side of the vehicle which faces the center of the road. Moreover, on parkways or four lane highways, or the like disabled cars frequently can be parked only at the left side of the road, so that even warning lamps and devices designed for right-side parking only are insufficient for modern traffic conditions.

Therefore, one object of the present invention is the provision of a device of the character described which can be attached easily to the end of a vehicle—usually to the rear end—and which normally does not protrude laterally beyond the vehicle, but a part of which can be pulled out laterally at either side of the vehicle at a distance of about three feet, and which carries at its outer end a source of light for indicating the distance which is to be kept clear at one side of the vehicle.

Another object of the present invention is the provision of a device of the character described which will be illuminated automatically if its source of light is pulled out laterally, and whose source of light will be disconnected automatically from the battery of the vehicle or from any other suitable source of current when its source of light has been pushed back into the device, so that no separate switch has to be operated for turning on or for extinguishing my new and improved repair and warning lamp for vehicles.

Still another object of the present invention is the provision of a device of the character described which will throw light on one side of the vehicle, so that the person making the repair does not need an additional light for carrying out the work, and which also will emit a warning light toward the rear of the vehicle, said warning light preferably being a red blinker light.

A further object of the present invention is the provision of a device of the character described which can be attached simply and without the application of any considerable amount of skill to newly manufactured vehicles as standard equipment as well as to vehicles already in use, and which is light in weight and of a pleasant, symmetrical outer appearance.

Yet still a further object of the present invention is the provision of a device of the character described which is simple in construction, so that it can be manufactured and sold at a very reasonable price, but which is also sturdy, durable, reliable in use, and well adapted to withstand the rough usage to which devices of this type frequently are subjected.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred forms of the invention have been shown.

In said drawings:

Figure 1 is a diagram of a preferred embodiment of my invention as it appears when it is expanded on the rear of a passenger automobile;

Figure 2 is an end view of the same;

Figure 3 is a longitudinal sectional view of the device as it appears when not in use shown as an exploded view with a fraction of the rear of a vehicle;

Figure 4 is a fractional enlarged side view of the embodiment of my invention of Figures 1 to 3, showing the device expanded;

Figure 5 is an enlarged sectional view on the line 5—5 of Figure 3; and

Figure 6 is a cross-sectional view on the line 6—6 of Figure 4.

Similar reference characters refer to similar parts throughout the several views.

In the drawing the numeral 1 denotes a tubular body of conductive material, which may be made as a vertical tube, or—as shown—from a pair of shells 2 and 3 of metal, which are semi-circular in cross-section having their longitudinal edges detachably joined to one another so that the shells form a tubular body and being provided at their inner sides with insulation 4 and 5. A conductive member 6 is provided at the inner side of the end portion of one of said shells being insulated from the shell 2 by a portion of the insulating layer 4 into which it is partially embedded. The numeral 7 denotes a conductive, threaded bolt connected to said conductive member and is extended through the wall of the shell 2 and insulated therefrom by an insulating bushing 8 and an insulating washer 9. A nut 10 is screwed upon the bolt 7, and a wire 11 (Figures 3 and 4) is secured to the bolt 7 by means of the nut 10. The wire 11 connects the bolt 7 (and the member 6) to one terminal 12 of a plug-in contact. The latter is mounted on an insulating member 14 at the outer side of the shell 2, and its second terminal 15 (Figure 3) is extended through the member 14 and conductively connected to the conductive shell 2. The terminals 12 and 15 are adapted for being inserted into a plug-in-socket 16 mounted on the center of the rear portion of the body 17 of a vehicle, which is indicated fractionally in dash-and-dotted lines in Figures 1, 2 and 3. The socket 16 is conductively connected to the battery (not shown) or to any other source of current within the vehicle body 17.

A pair of resilient clamps 18 are secured to the body 17 of the vehicle preferably at equal distance from the socket 16 and in horizontal alignment thereto. The clamps 18 are adapted for firmly engaging portions of the tubular body 1 for the purpose of securing the same detachably to the vehicle.

A first cap member 19 has a reduced cylindrical portion 20, into which extends one end portion each one of the shells 2 and 3, and an enlarged main portion 21 as well as a handle portion 22 outwardly extending from the main portion 21. A second cap member 23 has an enlarged cylindrical portion 24 and a reduced cylindrical portion 25 into which extend the other end portions of the shells 2 and 3. Thus the latter are held together as a tubular body 1 by the members 19 and 23, which fit tightly around the shells 2 and 3 so that these parts can be separated from each other only by the exertion of a considerable amount of effort if it is desirable to take them apart for cleaning or repairing purposes. A cap 27 of insulating material preferably is attached to the outer side of the shell 2 for covering the conductive parts 7, 10 and the non-insulated end portion of the wire or cable 11.

The insulation layers 4 and 5 of the shells 2 and 3 preferably have increased portions 28 and 29 at that end portions of the shells 2 and 3 which extend into the cap member 23, and a conductive pipe 30 is slidably extended therethrough and has one of its ends secured to a head member 31 by means of welding or the like. The head member 31 has a hollow cylindrical portion 32, opposite wall sections of which are provided with perforations that are closed by transparent, preferably curved plates 33 and 34. The plate 33 may be an ordinary glass plate or the like, while the plate 34 preferably consists of red glass or of any other suitable red transparent material. The portion 32 is so dimensioned that it can be slid easily into and out of the portion 24 of the cap member 23. A partition portion 35 is crosswise extended through the portion 32 of the head member 31 and protrudes outwardly beyond the portion 32, and that section thereof which thus protrudes is shaped as a handle portion 36, which preferably is of the same appearance and size as the handle portion 22, so as to attain a symmetrical appearance of the device. Mounted on the partition portion 35 is a blinker relay 37 and a pair of electric lamp sockets 38 and 40. The latter are so arranged that one lamp 41 extends into the portion 32 at one side of the partition portion 35, while the other lamp 42 extends into the portion 32 at the other side of the partition portion 35. A portion of that end of the conductive pipe 30 which is opposite the member 31 is formed as a contact member 43. Another contact member 44, adapted for engaging the member 6 when the pipe 30 is in the position shown in Figures 1 and 4, is secured to the end of the pipe 30 opposite the member 43 and is insulated from the pipe 30. In the instance shown there is extended an insulating bushing 46 through the parts 30 and 44 as well as through a pair of insulating washers 48, and a conductive screw 50 is extended through the bushing 46. An insulated wire 54 has its terminal 56 secured to the screw 50, whereas its other terminal 58 is connected to the terminal 60 of the blinker relays 37. A conductive member 62 connects one terminal of the lamp socket 38 directly to the terminals 58 and 60, and another conductive member 64 (Figure 5) connects the second terminal 66 of the blinker relays 37 to a terminal of the lamp socket 40.

The insulation 5 of the shell 3 is interrupted by a longitudinal slot 68, and the contact member 43 is slidable in said slot and in frictional engagement with the inner conductive portion of the shell 3, which is grounded by means of the clamps 18 when the device is attached to a vehicle. Thus when the pipe 30 is pulled out of the body 1, as shown in Figures 1 and 4, and the member 44 touches the member 6, the circuit is closed and the lamp 41 burns constantly while the lamp 42 goes on and off due to the blinker relays 37.

If the pipe 20 is pushed into the body 1 (Figure 3) the lamps are automatically switched off, and the member 31 fits tightly into the portion 24 of the member 23, so that the position of the pipe 30 cannot be changed relative to the body 1 by vibrations or the like. The outer side of the pipe 30 preferably is painted with a luminous paint.

While the lamps are burning, the lamp 41 illuminates the side and part of the front of the vehicle, while the lamp 42 gives out blinking signals toward the rear.

If the device is attached to a vehicle in the manner indicated in Figure 1, the head member 31 can be pulled out toward the left-hand side for parking on the right-hand side of a street. For parking on the left-hand side of a street the entire device is first detached from the vehicle, then is turned horizontally one hundred and eighty degrees and is reattached to the vehicle simply by inserting the terminals 12 and 15 into the socket 16 and forcing the tubular body 1 into the clamps 18, so that the member 31 can be pulled out toward the left-hand side.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A repair and warning lamp for vehicles comprising a pair of longitudinal shells having their longitudinal edges detachably joined to one another so that the shells form a tubular body and being provided at their inner sides with insulation, a conductive member provided at the inner side of the end portion of one of said shells being insulated from the latter and extended through the insulation at the inner side of the shell, a conductive bolt connected to said conductive member being extended through the wall of the shell and insulated therefrom, a first cap member having a reduced cylindrical portion into which extends one end portion of each shell and having a main portion adjacent said cylindrical portion and a handle portion outwardly extending from that end of said main portion which is opposite said cylindrical portion, a second cap member having an enlarged cylindrical portion and a reduced cylindrical portion into which extends the other end portion of each shell so that said shells are held together by said cap members to form a tubular body, a pipe slidably extending through said second cap member into said tubular body, a head member secured to one end of said pipe having a hollow perforated cylindrical portion which is slidable into and out of the enlarged cylindrical portion of said second cap member and having a handle portion outwardly extending from that end of said perforated cylindrical portion which is opposite said pipe, a pair of sockets holding lamps being mounted within the perforated cylindrical portion of said head member, transparent members closing the perforations of said cylindrical portion of said head member, a double terminal plug adapted for being plugged into a plug-in-socket at the center portion of the rear of a vehicle being secured to the outer side of one of said shells intermediate its ends and having one terminal conductively connected to the shell while its other terminal is insulated therefrom and is conductively connected to said conductive bolt, means for detachably securing said tubular member to the rear of a vehicle, and a pair of contact members provided at the other end of said pipe being in conductive connection with the terminals of the lamps in said sockets, one of said contact members being adapted for engaging the conductive member in one of said shells when the main portion of said pipe is pulled out from the tubular body, the other shell having its insulation interrupted by a longitudinal slot extending throughout the major portion of its length, and the other contact member being slidable in said slot in frictional engagement with the inner conductive portion of the shell.

2. A device of the character described comprising a pair of longitudinal shells having their longitudinal edges detachably joined to one another so that the shells form a tubular body and being provided at their inner sides with insulation, a conductive member provided at the inner side of the end portion of one of said shells being insulated from the latter and extended through the insulation at the inner side of the shell, a conductive bolt connected to said conductive member being extended through the wall of the shell and insulated therefrom, a first cap member having a reduced cylindrical portion into which extends one end portion of each shell and having a main portion adjacent said cylindrical portion and a handle portion outwardly extending from that end of said main portion which is opposite said cylindrical portion, a second cap member having an enlarged cylindrical portion and a reduced cylindrical portion into which extends the other end portion of each shell so that said shells are held together by said cap members to form a tubular body, a pipe slidably extending through said second cap member into said tubular body being made of conductive material and having one of its end portions formed as a first contact member, a head member secured with one end to one end of said pipe having a hollow cylindrical portion opposite wall sections of which are perforated and which is slidable into and out of the enlarged cylindrical portion of said second cap member and having a partition portion crosswise extended through said hollow cylindrical portion and protruding beyond that end of the hollow cylindrical portion which is opposite the end to which said pipe is secured and the thus protruding section of said partition portion being shaped as a handle, a pair of sockets mounted on said partition portion, an electric lamp held by each socket and the first one of said lamps extending into said hollow cylindrical portion at one side of said partition portion while the second lamp extends into said hollow cylindrical portion at the other side of said partition portion, a blinker relay mounted within said hollow cylindrical portion, transparent members closing the perforations in the wall sections of said hollow cylindrical portion, a double terminal plug adapted for being plugged into a plug-in-socket at the center portion of the rear of a vehicle being secured to the outer side of one of said shells intermediate its ends and having one terminal conductively connected to the shell while its other terminal is insulated therefrom and is conductively connected to said conductive bolt, a pair of clamps adapted for being secured to the rear of a vehicle and for detachably fastening thereto said tubular body, a second contact member being attached to and insulated from said pipe and adapted for engaging the conductive member which is extended through the insulation in one of said shells when the main portion of the pipe is pulled out of said tubular member, an insulated conductor extended through said pipe connecting said second contact member to one of the terminals of said blinker relay, a first electrical conductor connecting the aforementioned terminal of said blinker relay to a terminal of one of said lamps, and a second electrical conductor connecting the other terminal of said blinker relay to a terminal of the other lamp, the other shell having its insulation interrupted by a longitudinal slot extending throughout the major portion of its length, and the contact member formed by an end portion of said pipe being slidable in said slot and in frictional engagement with the inner conductive portion of the shell.

ALBERT R. SPARACO.

References Cited in the file of this patent

UNITED STATES PATENTS

| Number | Name | Date |
|---|---|---|
| 1,224,657 | Miller | May 1, 1917 |
| 1,388,550 | Cook | Aug. 23, 1921 |
| 2,082,905 | Riggs | June 8, 1937 |
| 2,186,498 | Riggs | Jan. 9, 1940 |